United States Patent
Chambron et al.

(10) Patent No.: US 10,392,251 B2
(45) Date of Patent: Aug. 27, 2019

(54) TREATMENT METHOD FOR SEPARATING CARBON DIOXIDE AND HYDROGEN FROM A MIXTURE

(71) Applicant: L'Air Liquide, Societe Anonyme pour l'Etude et l'Exploitation des Procedes Georges Claude, Paris (FR)

(72) Inventors: Nicolas Chambron, Nogent sur Marne (FR); Richard Dubettier-Grenier, La Varenne Saint Hilaire (FR); Mathieu Leclerc, Paris (FR); Pascal Marty, Bry sur Marne (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 325 days.

(21) Appl. No.: 15/311,390

(22) PCT Filed: May 11, 2015

(86) PCT No.: PCT/FR2015/051224
§ 371 (c)(1),
(2) Date: Nov. 15, 2016

(87) PCT Pub. No.: WO2015/173499
PCT Pub. Date: Nov. 19, 2015

(65) Prior Publication Data
US 2017/0081186 A1    Mar. 23, 2017

(30) Foreign Application Priority Data
May 15, 2014 (FR) ..................... 14 54349

(51) Int. Cl.
*C01B 3/50* (2006.01)
*C01B 3/56* (2006.01)
(Continued)

(52) U.S. Cl.
CPC ............... *C01B 3/506* (2013.01); *C01B 3/56* (2013.01); *F25J 3/0223* (2013.01); *F25J 3/0252* (2013.01);
(Continued)

(58) Field of Classification Search
CPC ......... C01B 3/506; C01B 3/025; B01D 53/06; B01D 53/002; B01D 53/75
See application file for complete search history.

(56) References Cited

U.S. PATENT DOCUMENTS

2002/0073845 A1* 6/2002 Reddy ................. B01D 53/047
                                                                  95/96
2007/0227353 A1* 10/2007 Kumar ............... B01D 53/0476
                                                                  95/96

(Continued)

FOREIGN PATENT DOCUMENTS

EP    0 341 879    11/1989
EP    2 023 066     2/2009
(Continued)

OTHER PUBLICATIONS

Qu Guohua, et al, "Technology for Producing Hydrogen by the Gasification of Petroleum Coke," China Petrochemical Press, 1st Edition, Jan. 2014.
(Continued)

*Primary Examiner* — Emmanuel E Duke
(74) *Attorney, Agent, or Firm* — Justin K. Murray

(57) ABSTRACT

The invention relates to a method for treating a mixture in order to separate carbon dioxide and hydrogen from said mixture, in which: i) the mixture is cooled and partially condensed and a first liquid is separated from the rest of the mixture in a first phase separator; ii) a gas from or derived from a gas from the first phase separator is treated in a hydrogen pressure swing adsorption module in order to
(Continued)

produce a hydrogen-rich gas and a hydrogen-depleted residual gas; and iii) said hydrogen-depleted residual gas or a gas derived from said depleted gas is cooled and partially condensed and a second liquid is separated from the remaining gas in a second phase separator, separate from the first phase separator, wherein the first and/or second liquid being rich in carbon dioxide. The invention also relates to an installation for implementing such a method.

18 Claims, 6 Drawing Sheets

(51) Int. Cl.
  *F25J 3/06* (2006.01)
  *F25J 3/02* (2006.01)
(52) U.S. Cl.
  CPC ........ *F25J 3/0266* (2013.01); *F25J 3/0271* (2013.01); *F25J 3/067* (2013.01); *F25J 3/0625* (2013.01); *F25J 3/0655* (2013.01); *C01B 2203/025* (2013.01); *C01B 2203/0233* (2013.01); *C01B 2203/0244* (2013.01); *C01B 2203/0283* (2013.01); *C01B 2203/042* (2013.01); *C01B 2203/043* (2013.01); *C01B 2203/0405* (2013.01); *C01B 2203/046* (2013.01); *C01B 2203/0475* (2013.01); *C01B 2203/146* (2013.01); *F25J 2200/02* (2013.01); *F25J 2205/04* (2013.01); *F25J 2205/40* (2013.01); *F25J 2205/60* (2013.01); *F25J 2205/80* (2013.01); *F25J 2210/04* (2013.01); *F25J 2230/32* (2013.01); *F25J 2230/80* (2013.01); *F25J 2240/40* (2013.01); *F25J 2245/02* (2013.01); *F25J 2270/02* (2013.01); *Y02C 10/08* (2013.01); *Y02C 10/12* (2013.01); *Y02P 20/152* (2015.11)

(56) References Cited

U.S. PATENT DOCUMENTS

| 2009/0293539 | A1* | 12/2009 | Briglia | C01B 3/506 |
| | | | | 62/625 |
| 2010/0129284 | A1* | 5/2010 | Niitsuma | B01D 53/047 |
| | | | | 423/437.1 |
| 2011/0203313 | A1* | 8/2011 | Huda | C01B 3/12 |
| | | | | 62/617 |
| 2011/0223100 | A1* | 9/2011 | Monereau | B01D 53/002 |
| | | | | 423/648.1 |
| 2012/0000243 | A1* | 1/2012 | Bough | C01B 3/16 |
| | | | | 62/617 |

FOREIGN PATENT DOCUMENTS

| FR | 2 877 939 | 5/2006 |
| FR | 2 939 785 | 6/2010 |
| WO | WO 2006/054008 | 5/2006 |
| WO | WO 2006/097703 | 9/2006 |

OTHER PUBLICATIONS

International Search Report and Written Opinion for PCT/FR2015/051224, dated Jul. 17, 2015.

* cited by examiner

TREATMENT METHOD FOR SEPARATING CARBON DIOXIDE AND HYDROGEN FROM A MIXTURE

CROSS REFERENCE TO RELATED APPLICATIONS

This application is a § 371 of International PCT Application PCT/FR2015/051224, filed May 11, 2015, which claims the benefit of FR1454349, filed May 15, 2014, both of which are herein incorporated by reference in their entireties.

FIELD OF THE INVENTION

The present invention relates to a process for treating a mixture for the purpose of separating carbon dioxide ($CO_2$) and hydrogen ($H_2$) from this mixture.

BACKGROUND OF THE INVENTION

Currently, one of the main techniques used in the field of hydrogen production is the steam reforming of hydrocarbons, especially including methane (SMR, the acronym for Steam Methane Reforming). Other techniques such as autothermal reforming (ATR) and catalytic or non-catalytic partial oxidation (POX) may also be used depending on the type of raw material to be treated. Via the reforming reaction, hydrocarbons are converted into a gaseous mixture comprising hydrogen ($H_2$) and carbon monoxide (CO) according to the following reactions $C_nH_m + nH_2O +$ heat$\rightarrow nCO + (n+m/2)H_2$ or $C_nH_m + n/2O_2 \rightarrow nCO + (m/2)H_2$ as a function of the technique used.

The gaseous mixture thus produced is then commonly sent to a shift reactor (Water gas shift reactor) so as to produce more $H_2$ and to convert the CO into $CO_2$ via the following exothermic reaction: $CO + H_2O \rightarrow CO_2 + H_2$. The gas thus obtained, which is rich in $CO_2$ and $H_2$, is then generally sent to a pressure swing adsorption module for hydrogen, known as PSA $H_2$ (PSA being the acronym for Pressure Swing Adsorption), which allows hydrogen to be produced in high purity (from 99 mol % to 99.9999 mol %).

The residue from the pressure swing adsorption module for hydrogen (also known as the off-gas from the pressure swing adsorption module for hydrogen or off-gas from the PSA) itself contains all the $CO_2$, the vast majority of the unconverted $CH_4$ and CO, nitrogen ($N_2$), argon (Ar) and hydrogen, the amount of which depends on the yield of the hydrogen pressure swing adsorption module.

Most commonly, the residual gas, including the $CO_2$ it contains, is used as fuel in the burners of the reforming oven. The heat is used in the context of a thermal integration of the overall unit and/or to export steam. The residual gas is then expelled to the air.

In the context of reducing $CO_2$ emissions into the atmosphere, solutions have been developed to make it possible to recover as much $CO_2$ as possible in gaseous mixtures such as residual gases.

It is known practice, for example, to treat the residual gas from the pressure swing adsorption module for hydrogen to extract the $CO_2$ therefrom.

EP-A-0 341 879 describes, for example, a treatment of the residue from the pressure swing adsorption module for hydrogen using a pressure swing adsorption module for carbon dioxide (PSA $CO_2$) and a cryogenic part.

WO-A-2006/054 008, for its part, treats the residue from the pressure swing adsorption module for hydrogen using a cryogenic step and membranes. This process makes it possible to produce a stream of pure $CO_2$, a stream of uncondensables and a stream rich in $H_2$.

It is also possible to treat the gaseous mixture obtained via a second shift reaction upstream of the pressure swing adsorption module for hydrogen. Thus, FR-A-2 939 785 describes the use of a pressure swing adsorption module for $CO_2$ and a cryogenic step producing a stream of pure $CO_2$ and a stream rich in $H_2$ which is treated thereafter in the pressure swing adsorption module for hydrogen.

These various methods for recovering $CO_2$ are complex and require expensive installations especially with several pressure swing adsorption modules. There is thus a need for a process and/or an installation for separating and recovering $CO_2$ and $H_2$ from a mixture.

WO-A-2006/097 703 and FR-A-2 877 939 describe a process according to the preamble of claim 1, in which the adsorption module separates the mixture upstream of a cryogenic separation step.

SUMMARY OF THE INVENTION

The present invention provides a solution to this need, which is simple, efficient and economical.

The invention proposes, to this end, a process for treating a mixture for the purpose of separating carbon dioxide and hydrogen from this mixture, in which:
  i) the mixture is cooled and partially condensed, a first liquid is separated from the mixture in a first phase separator,
  ii) a gas originating or derived from a gas originating from the first phase separator is treated in a pressure swing adsorption module for hydrogen to produce a hydrogen-rich gas and a hydrogen-depleted residual gas, and
  iii) said hydrogen-depleted residual gas or a gas derived from said hydrogen-depleted gas is cooled and partially condensed, a second liquid is separated from the remaining gas in a second phase separator, different from the first phase separator, the first and/or second liquid or a liquid derived from the first and/or second liquid originating from the first phase separator and/or from the second phase separator being rich in carbon dioxide characterized in that the partial condensations in steps i) and iii) are performed in the same cryogenic unit.

In the present application, the term gas or liquid "originating" from a step or from an element means a gas or a liquid that is generated directly by this step or which originates directly from an element. In contrast, a "derived" gas or liquid is a gas or a liquid which may, after said step or said element, have been subjected to at least one additional step or treated with at least one additional element.

Moreover, the term "rich in" means comprising at least 50% of the substance concerned, preferably at least 60%, or even 70%, or even 80%, and optimally at least 90%, or even 95%, or even 99%. The term "poor in" means comprising not more than 50% of the substance concerned, preferably not more than 40%, or even 30%, or even 20%, and optimally not more than 10%, or even 5%, or even 1%. A gas, a liquid, a mixture, a stream, a flow, a fraction, a permeate or a residue may be rich or poor in a substance.

The present invention allows the separation and recovery of $CO_2$ by means of two steps of partial cryogenic condensation and separation that are applied, respectively, to the mixture feeding the pressure swing adsorption module for hydrogen and to the residual gas leaving the pressure swing adsorption module for hydrogen. The invention thus makes it possible to obtain a gas rich in $H_2$ (produced by the pressure swing adsorption module for hydrogen) and at least one liquid rich in $CO_2$, which avoids expelling this $CO_2$ into the air. The reduction of the $CO_2$ content of the mixture entering the pressure swing adsorption module for hydrogen also makes it possible to reduce the size of this module and to improve its yield.

The term "cryogenic" is used in this text in a broad sense, encompassing any temperature below $-10°$ C., or even below $-40°$ C.

A pressure swing adsorption module (PSA) is technology used for separating various gases of a mixture under pressure at temperatures close to room temperature, as a function of their molecular characteristics and of their affinity for an adsorbent material. The adsorbent materials (for example zeolites) are used as molecular sieves preferentially adsorbing the target gases. Once the target gases have been adsorbed at high pressure, the system is placed under low pressure for desorption of the adsorbed gases and release thereof A pressure swing adsorption module for hydrogen (PSA $H_2$) is a pressure swing adsorption module that makes it possible to separate hydrogen from the rest of the constituents of a gaseous mixture.

Advantageously, the partial condensations in steps i) and iii) are performed in the same heat exchanger, known as the main exchanger. Such a process makes it possible to optimize the recovery of $CO_2$ and to reduce the energy costs.

A cryogenic unit may comprise at least one heat exchanger of multi-fluid type and at least one phase separator. The exchanger may be a brazed aluminum heat exchanger (BAHX), for example.

As a variant, the cryogenic unit may comprise two heat exchangers that are each used to perform one of the above-mentioned condensation steps. The exchangers are then preferably coupled to reduce the energy cost.

Advantageously, the partial condensation of the mixture or of the gas, in steps i) and iii), takes place under conditions close to the triple point of $CO_2$ (5.2 bar at $-56.6°$ C.) so that the stream rich in $CO_2$ is generated in liquid form and can be separated from the remaining components in gaseous form referred to as being uncondensable, such as $CH_4$, CO, $N_2$, Ar and $H_2$.

The mixture or the gas may be partially condensed in step i) or iii) at a temperature below $-20°$ C. and more particularly below $-40°$ C.

In one embodiment of the invention, step i) comprises the following substeps:
  a first partial condensation of said mixture at a temperature below $-20°$ C., and more particularly close to about $-40°$ C.,
  separation of the liquid from the rest of the mixture in a phase separator,
  a second partial condensation of said rest of the mixture at a temperature below $-40°$ C. and more particularly about $-50°$ C.,
  separation of the liquid from the remaining gas in another phase separator, the liquid or a liquid derived from the liquid originating from at least one of the phase separators being rich in carbon dioxide.

This embodiment makes it possible to reduce the consumption of cold in the process by cooling all of the stream entering the exchanger only down to an intermediate temperature and by cooling down to a very low temperature only a reduced flow constituted only by the phase not condensed at the intermediate temperature. The condensate that would already have formed at an intermediate temperature (from about $-20$ to $-40°$ C.) is thus not needlessly cooled to very low temperature.

This embodiment also makes it possible to produce, from the first phase separator, a stream that is more concentrated in $CO_2$ than at the outlet of the second phase separator.

Specifically, $CO_2$ condenses very readily compared with the other constituents of the mixture and its condensation at a higher temperature allows it to be condensed in a smaller amount but in purer form than at a colder temperature where other constituents would also be condensed.

The process according to the invention may comprise, before step i), a preliminary step of generating a mixture rich in CO and $H_2$. It may be, for example, a catalytic or non-catalytic partial oxidation (PDX) or a step of steam reforming of hydrocarbons (SMR) or a step of auto-thermal forming (ATR) optionally combined with one or more shift reactors.

Partial oxidation (PDX) takes place when an air-fuel mixture in a sub-stoichiometric amount is partially burnt in a reforming unit, thus creating a synthesis gas rich in hydrogen according to the chemical reaction: $C_nH_m + n/2 O_2 \rightarrow nCO + (m/2)H_2$.

The steam reforming of hydrocarbons, especially steam methane reforming (SMR), is widely used in industry for manufacturing hydrogen from hydrocarbons such as natural gas. Methane (or light hydrocarbons such as biogas or refinery raw materials) is mixed with water vapor and then injected into tubes filled with catalysts (generally nickel) and brought to very high temperature to produce hydrogen according to the reaction $C_nH_m + nH_2O + \text{heat} \rightarrow nCO + (n+m/2)H_2$.

Auto-thermal reforming (ATR) is a method combining the two preceding methods. It consists in using the energy released by the exothermic oxidation reaction of hydrocarbons to promote the methane reforming reaction in the presence of water. The reactions take place in a single chamber.

The mixture rich in CO and $H_2$ may then be treated in a shift reactor to give a mixture enriched in $CO_2$ and $H_2$. This enrichment takes place by the shift reaction (or water-gas shift (WGS) reaction), in which CO reacts with water to form $CO_2$ and $H_2$: $CO + H_2O \rightarrow CO_2 + H_2$.

The synthesis gas thus obtained may then be compressed and/or dehydrated.

According to one embodiment of the invention, the liquid or a liquid derived from the liquid originating from at least one of the phase separators is distilled to give a $CO_2$-rich fraction and a $CO_2$-depleted fraction.

This distillation step makes it possible to produce a $CO_2$-rich fraction with a high purity (of the order of a ppm of methane, for example). It may be performed by means of a distillation column, which makes it possible to remove compounds such as methane, carbon monoxide, nitrogen, argon and/or hydrogen. The $CO_2$-depleted fraction may be recycled by mixing it with said mixture, before step i), upstream of the first phase separator, or by mixing it with said $H_2$-depleted gas, between steps ii) and iii), upstream of the second phase separator. Specifically, said fraction contains an appreciable amount of $CO_2$ which may be recycled into various levels of the process to maintain a high $CO_2$ recovery yield.

In the present patent application, the terms "recycle", "recycled" and "recycling" mean the reinjection into the treatment process circuit of a liquid or a gas (which might be considered as a residual stream) to recover $CO_2$ and/or $H_2$ from this liquid or gas, which may be present in an appreciable amount.

In another embodiment of the invention, said remaining gas originating from the second phase separator is filtered by at least one membrane system.

Membrane systems are preferably constituted of permeation membranes. Permeation is the penetration of a constituent through a thin layer of material. It is directly linked to the concentration gradient of the constituent, the intrinsic permeability of the material, and its coefficient of diffusion. Permeation is modelized, for example, by the equations of Fick's diffusion laws, and may be measured using tools such as a permeameter. Membranes in which $CO_2$ and $H_2$ have high permeance and selectivity will be chosen.

The use of membrane systems makes it possible to recover an appreciable amount of $CO_2$ and of $H_2$ still contained in the remaining gas exiting the second phase separator. It is thus possible to achieve very high $CO_2$ recovery yields (for example of more than 95%) while at the same time increasing the $H_2$ production yield.

Advantageously, said remaining gas originating from the second phase separator (step iii)) is treated in a first membrane system leading to the production of an $H_2$-rich permeate and a $CO_2$-rich residue.

Said $H_2$-rich permeate may be recycled by mixing it with said mixture, before step i), or with said gas originating or derived from a gas originating from the first phase separator, between steps i) and ii), upstream of the pressure swing adsorption module for hydrogen and/or at the inlet of the pressure swing adsorption module for hydrogen. The $H_2$ production yield is thus improved. Depending on the pressure of said permeate, it may optionally be compressed before being recycled.

Said $CO_2$-rich residue is advantageously treated in a second membrane system leading to the production of a $CO_2$-rich permeate and of a residue rich in $CH_4$, CO, $N_2$ and Ar and poor in $H_2$ and $CO_2$.

Said $CO_2$-rich permeate may be recycled by mixing it with the $H_2$-depleted gas, between steps ii) and iii), upstream of the second phase separator of step iii).

Depending on the pressure of said permeate, it may optionally be compressed before being recycled.

The invention also relates to an installation for performing the process as described previously, characterized in that it comprises:
  a pressure swing adsorption module for hydrogen, and
  a cryogenic unit comprising a first and a second phase separators and a heat exchanger comprising a first cooling circuit, one entry of which is configured to be connected to a source of said mixture, and one outlet of which is connected to the first phase separator, a gas outlet of which is connected to the inlet of the pressure swing adsorption module for hydrogen, the pressure swing adsorption module for hydrogen comprising a hydrogen-depleted gas outlet that is connected to an inlet of a second cooling circuit of the heat exchanger or of another heat exchanger of the cryogenic unit, an outlet of this second cooling circuit being connected to the second phase separator.

The heat exchanger comprising the first and/or second cooling circuit may comprise a heating circuit, one inlet of which is connected to the gas outlet of the first phase separator, and the outlet of which is connected to the inlet of the pressure swing adsorption module for hydrogen.

The installation may also comprise at least one element from among:
  a reforming unit,
  a shift reactor,
  a drying unit,
  a distillation column,
  at least one membrane system,
  at least one compressor,
  at least one expander,
  at least one valve,
  at least one pump,
  a hydrogen gas outlet connected to the module.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be better understood, and other aims, details, characteristics and advantages thereof will emerge more clearly in the course of the detailed explanatory description that follows, of several embodiments of the invention given as purely illustrative and nonlimiting examples, with reference to the attached schematic drawings.

Figure 1:
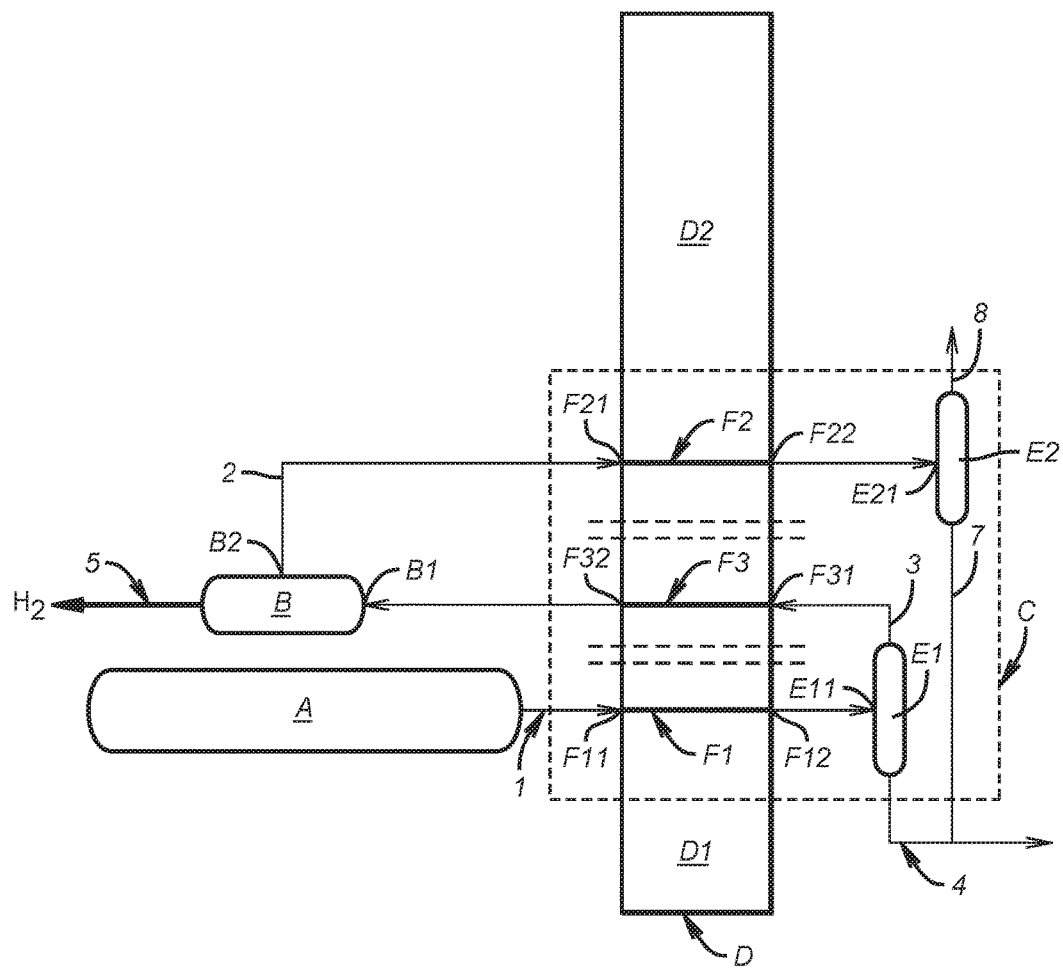
FIG. 1 schematically illustrates an installation for performing a treatment process according to an embodiment of the present invention.

In these drawings:
  FIG. 1 schematically illustrates an installation for performing a treatment process according to the invention; and
  FIGS. 2 to 6 schematically represent embodiment variants of the installation for performing the process according to the invention.

FIG. 1 shows an installation for performing the elementary steps of the process according to the invention, for treating a mixture 1 for the purpose of separating carbon dioxide ($CO_2$) and hydrogen ($H_2$) from this mixture.

The installation of FIG. 1 thus comprises:
  a source A of mixture 1,
  a pressure swing adsorption module for hydrogen (PSA $H_2$) B, and
  a cryogenic unit C comprising one or two heat exchangers D1 and D2 and first and second phase separators E1 and E2.

In the cryogenic unit, all the elements illustrated do not operate at cryogenic temperatures. Only the low temperature part of the exchanger and the two phase separators, and also the pipes connecting them, operate at temperatures below −10° C.

For greater clarity, we will use in the rest of the description the term PSA $H_2$ to denote a pressure swing adsorption module for hydrogen.

In the preferred case in which the cryogenic unit C comprises only one heat exchanger, referred to as the main exchanger D, this exchanger comprises several circuits including:
a first cooling circuit F1 whose inlet F11 is configured to be connected to the source A of said mixture 1 and whose outlet F12 is connected to the inlet E11 of the first phase separator E1,
a second cooling circuit F2 whose inlet F21 is connected to the hydrogen-depleted gas 2 outlet B2 of the PSA $H_2$ B and whose outlet F22 is connected to the inlet E21 of the second phase separator E2, and
a heating circuit F3, whose inlet F31 is connected to the gas outlet 3 of the first phase separator E1 and whose outlet F32 is connected to the inlet B1 of the PSA $H_2$ B.

In the case where the cryogenic unit C comprises two independent exchangers D1 and D2, as is schematically represented by the parallel dashed lines in FIG. 1, two options may be envisaged: the first exchanger D1 comprises circuit F1 and optionally circuit F3, and the second exchanger D2 comprises circuit F2 and optionally circuit F3 (if the latter circuit does not form part of the first exchanger D1).

The process according to the invention comprises three successive steps i), ii) and iii):
i) mixture 1 is partially condensed and a first liquid 4 obtained is separated from the rest (gas 3) of the mixture in the first phase separator E1,
ii) gas 3 is treated in the PSA $H_2$ B to produce an $H_2$-rich gas 5 and an $H_2$-depleted gas 2, and
iii) the $H_2$-depleted gas 2 is partially condensed and a second liquid 7 obtained is separated from the remaining gas 8 in the second phase separator E2.

In the first step i), mixture 1 circulates in the cooling circuit F1 and is thus cooled, for example to a very low temperature (about −50° C.) to condense the $CO_2$ present in mixture 1. As explained in the text hereinabove, condensation of the $CO_2$ is obtained by applying to mixture 1 conditions close to the triple point of $CO_2$ (5.2 bar at −56.6° C.) so that the $CO_2$ passes into liquid form and can be separated from the remaining gases comprising uncondensables, such as $CH_4$, CO, $N_2$, Ar and $H_2$. The first liquid 4 originating from the first phase separator E1 is thus rich in $CO_2$ (from about 95% to 99%), whereas gas 3 leaving this separator E1 contains virtually all of the $H_2$, a very large amount of the most volatile molecules ($CH_4$, CO, $N_2$, Ar) and still an appreciable amount of $CO_2$.

Between steps i) and ii), gas 3 circulates in the heating circuit F3 so that it exchanges heat with the fluids circulating in the other circuits F1, F2. Given that gas 3 is very cold, it will absorb heat and will release cold on circulating in the circuit F3, and will leave this circuit with a temperature above its entry temperature, which explains why this circuit D3 is known as the heating circuit.

In step the PSA $H_2$ B makes it possible to separate the hydrogen from the rest of the constituents of gas 3 leaving the circuit F3, with a yield of between 75% and 95%. The purity of the hydrogen produced (gas 5) is then greater than 99 mol %. The $H_2$-depleted gas 2 produced by the PSA $H_2$ B contains, for its part, virtually all of the $CO_2$ present in the gas entering the PSA $H_2$ B, the other constituents ($CH_4$, CO, $N_2$, Ar) and especially an appreciable amount of $H_2$ resulting from the non-total yield of PSA $H_2$ B. In the third step iii), gas 2 circulates in the cooling circuit F1 and is thus cooled, for example to a very low temperature (about −50° C.), to condense the $CO_2$ present in this gas 2, under the same conditions as those outlined above (close to the triple point of $CO_2$). The second liquid 7 originating from the second phase separator E2 is thus rich in $CO_2$, whereas gas 8 leaving this separator E2 contains virtually all of the uncondensables ($CH_4$, CO, $N_2$, Ar) and an appreciable amount of $H_2$ and $CO_2$.

The liquids 4 and 7 originating from the phase separators E1 and E2 are rich in $CO_2$. Such a process makes it possible to achieve an overall $CO_2$ recovery yield of more than 90%.

Figure 2:
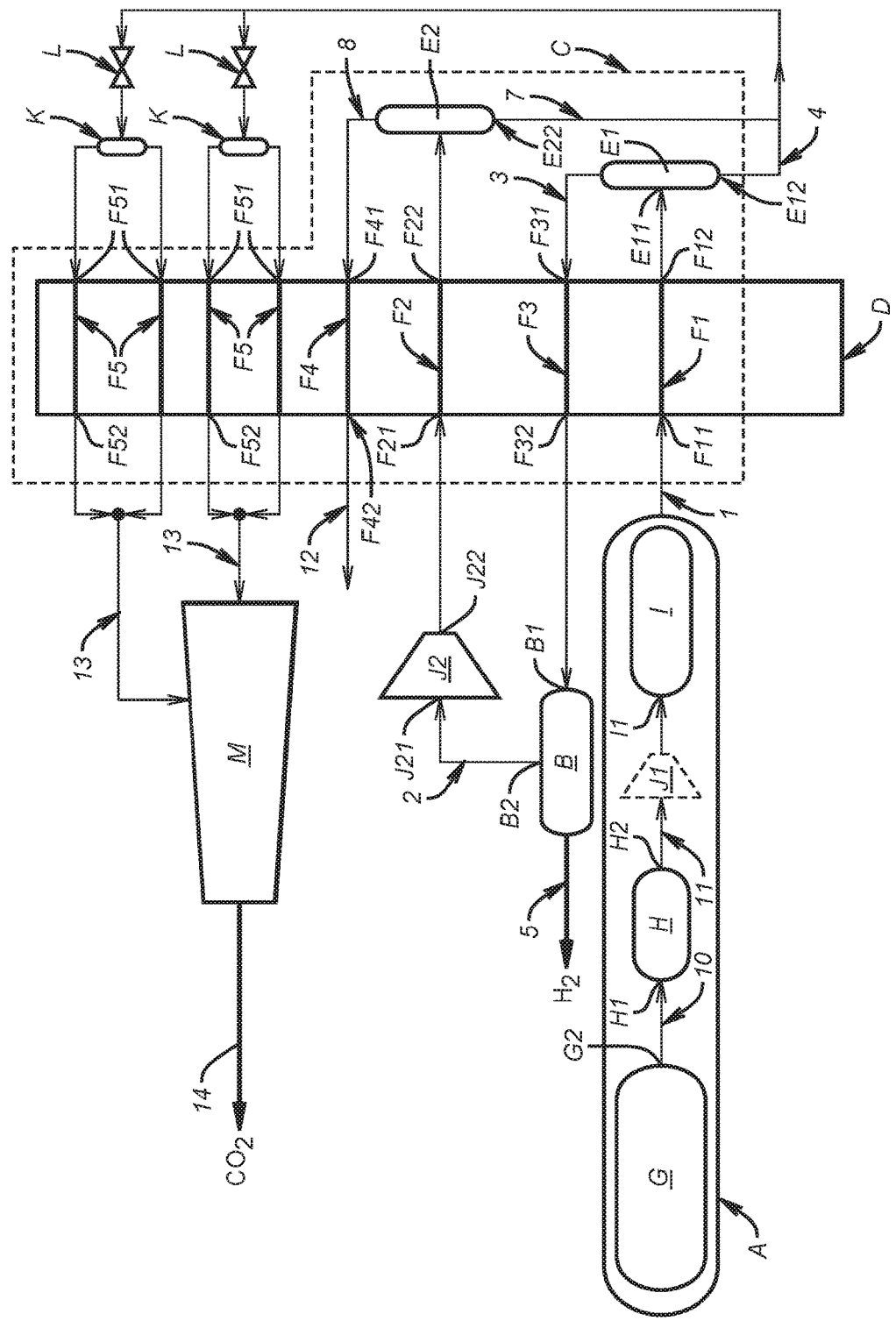
FIG. 2 provides an alternate embodiment of the present invention.

FIG. 2 shows an embodiment variant of the installation for performing the process according to the invention, in which mixture 1 to be treated is a synthesis gas.

In this variant, the source A of mixture 1 comprises:
a reforming unit G,
a shift reactor H,
a drying unit I,
and optionally a compressor J1.

The reforming unit G makes it possible to generate via an ATR, SMR or PDX process a mixture 10 rich in CO and in $H_2$. The outlet G2 of the reforming unit G is connected to the inlet H1 of the shift reactor H which transforms the mixture 10 into a gaseous mixture 11 enriched in $CO_2$ and $H_2$. The outlet H2 of the shift reactor H is connected to inlet I1 of the drying unit I, optionally via the compressor J1, to produce a synthesis gas corresponding to mixture 1.

The technology used for the shift reaction (H) may be a high temperature shift or a high temperature then low temperature shift (High Temperature Shift+Low Temperature Shift) or an isothermal shift or an isothermal shift then a low temperature shift (Isothermal Shift+Low Temperature Shift). The isothermal shift technology may be preferred since it allows a higher degree of conversion. In this technology, the reforming gas passes through tubes filled with catalyst immersed in water. The heat of the reformed gas is reused to produce the steam required for the reaction.

The drying unit I makes it possible to dehydrate the gaseous mixture 11, for example by desiccation. Advantageously, this is the only drying step. Placing this step at high pressure before the abovementioned step i) makes it possible to maximize the drying efficiency and to increase the yield of the PSA $H_2$ B in step ii).

Depending on the pressure at which the step for generating mixture 10 takes place, a step of compressing the gaseous mixture 11 may optionally be added before the drying step in unit I.

The positioning of this optional compression relative to the drying step may result from an optimum between adsorbing the humidity at a high pressure and the cost of the adsorption bottles at such a pressure.

Mixture 1 thus obtained is constituted mainly of $H_2$, CO and $CO_2$.

In the variant of FIG. 2, the cryogenic unit C comprises a single multi-fluid heat exchanger, known as the main exchanger D. This exchanger comprises the first and second cooling circuits F1 and F2 and the heating circuit F3 described previously. It also comprises a second heating circuit F4, the inlet F41 of which is connected to the outlet for the remaining gas 8 of the second phase separator E2 and the outlet F42 of which provides a gas 12 containing virtually all of the uncondensables ($CH_4$, CO, $N_2$, Ar) and optionally an appreciable amount of $H_2$ and $CO_2$. The passage of the gas 8 in circuit F4 of the exchanger allows the gas 8 to absorb heat and to release cold, which is thus recovered for the condensation in steps i) and iii).

The installation also comprises a compressor J2 whose inlet J21 is connected to the outlet B2 of the PSA $H_2$ B and whose outlet J22 is connected to the inlet F21 of the second cooling circuit F2. This compressor J2 makes it possible to compress the hydrogen-depleted gas 2 produced by the PSA H$_2$ B, which is at low pressure (from about 1.0 to 5.0 bar), up to a high pressure (for example of the same order of magnitude as that of mixture 1 entering the main exchanger D).

In the example represented, the installation also comprises a third heating circuit F5, expanders K, valves L and a compressor M.

The heating circuit F5 comprises several inlets F51 (here, four inlets F51 are represented) connected to the outlets E12 and E22 of the two phase separators E1 and E2, via valves L and expanders K, and several outlets F52 (here, four outlets F52 are represented) connected to the compressor M. The liquids 4 and 7 leaving the two phase separators E1 and E2 are mixed and then expanded to different pressure levels and heated in the circuits F5, releasing cold by vaporization, and then leave these circuits to produce a stream 13 of purified CO$_2$.

Before expansion, the liquids 4, 7 may be undercooled through the main exchanger D (step not shown in the figure) especially so as to limit the flash during the expansions known as the "LP" and "HP" expansions and thus to limit the loss of cold generated by these flashes.

The compressor M may be associated with a pump to deliver a stream 14 of purified CO$_2$ at a predetermined pressure.

Figure 3:
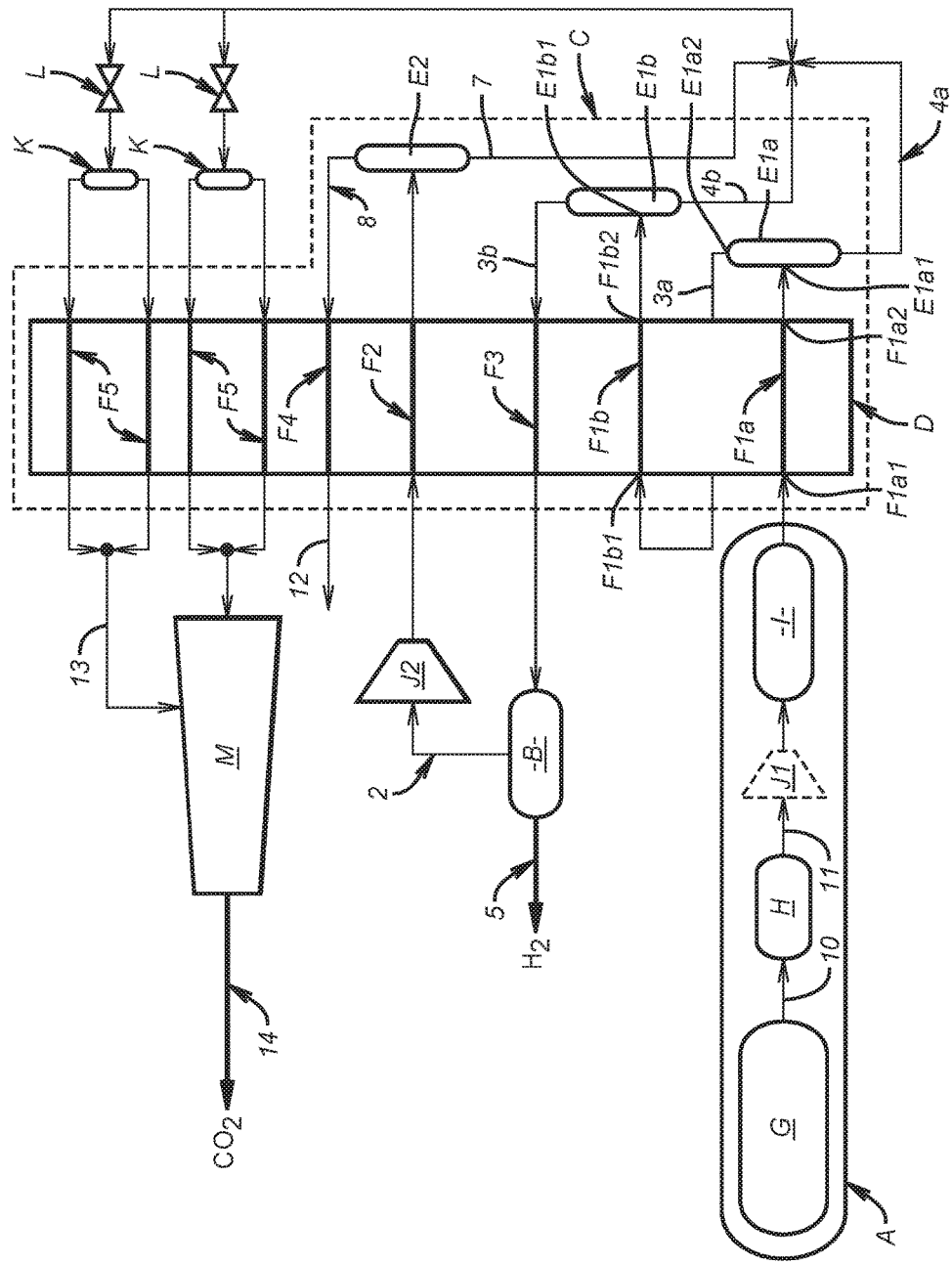
FIG. 3 provides an alternate embodiment of the present invention.

FIG. 3 shows another embodiment variant of the installation for performing the process according to the invention, which differs from the preceding variant of FIG. 2 essentially by the fact that the first cooling circuit F1 and the first phase separator E1 are replaced by two cooling circuits F1$a$, F1$b$ and two phase separators E1$a$, E1$b$. This installation makes it possible to cool the mixture 1 in two steps and thus to reduce the cold consumption of the installation.

Thus, the heat exchanger D of the cryogenic unit C of the installation of FIG. 3 comprises several circuits:
a first cooling circuit F1$a$ configured to cool the mixture 1 to a temperature below −20° C., for example,
an intermediate cooling circuit F1$b$ configured to cool to a temperature below −40° C., for example,
a second cooling circuit F2, and
heating circuits F3, F5.

The second cooling circuit F2 and the heating circuits F3, F5 are identical to those of the variant of the installation described previously with reference to FIG. 2.

The first cooling circuit F1$a$ comprises an inlet F1$a$1 configured to be connected to the source A of said mixture 1 and an outlet F1$a$2 connected to the inlet E1$a$1 of a phase separator E1$a$. The intermediate cooling circuit F1$b$ comprises an inlet F1$b$1 connected to the gas 3$a$ outlet E1$a$2 of this phase separator E1$a$ and an outlet F1$b$2 connected to the inlet E1$b$1 of another phase separator E1$b$. As described in the text hereinabove, the gas 3$b$ leaving the phase separator E1$b$ feeds the heating circuit F3.

In this variant, the process performed comprises, in the condensation and separation step i), the following substeps:
a first partial condensation of the mixture 1 at a temperature below −20° C. and more particularly of about −40° C.,
separation of the liquid 4$a$ from the rest of the mixture 3$a$ in the phase separator E1$a$,
a second partial condensation of the rest of the mixture 3$a$ at a temperature below −40° C., and more particularly of about −50° C., and
separation of the liquid 4$b$ from the remaining gas 3$b$ in the other phase separator E1$b$.

The liquids 4$a$ and 4$b$ originating from the phase separators E1$a$ and E1$b$ are rich in CO$_2$ and are mixed here with the liquid 7 originating from the phase separator E2, before being expanded and vaporized, as explained in the text hereinabove.

Figure 4:
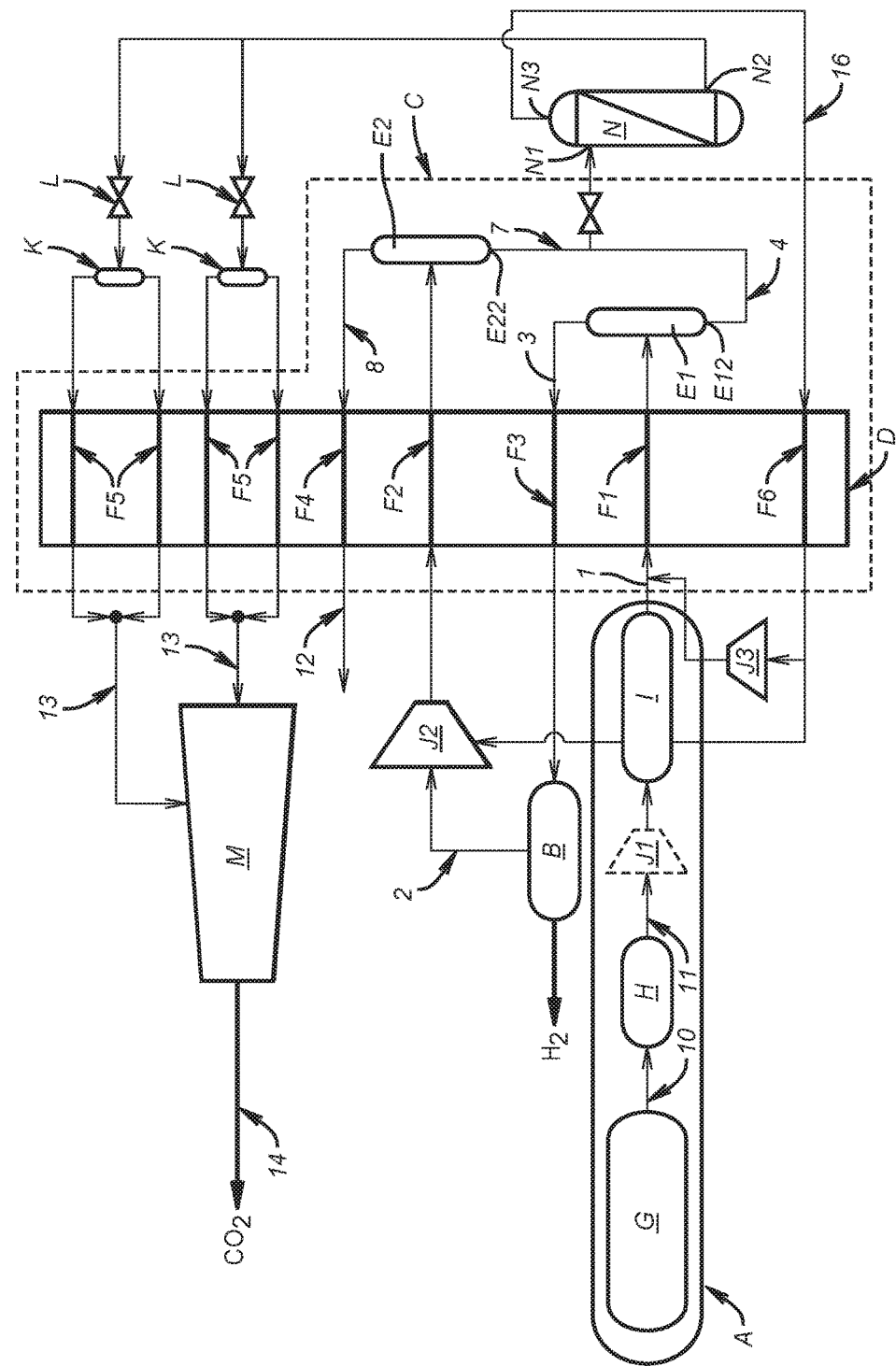
FIG. 4 provides an alternate embodiment of the present invention.

FIG. 4 shows another embodiment variant of the installation for performing the process according to the invention. This variant differs from that described in reference to FIG. 2 essentially in that the installation comprises a distillation column N. This distillation column N comprises an inlet N1 connected, for example via a valve, to the outlets E12 and E22 of liquids 4, 7 of the two phase separators E1 and E2. The distillation column N also comprises a first outlet N2 providing a CO$_2$-rich fraction 15 with a high purity, and a second outlet N3 providing a CO$_2$-depleted fraction 16.

The first outlet N2 of the column N is connected to the heating circuit F5 via valves L and expanders K. Fraction 15 is thus converted into a stream 13 of purified CO$_2$ and then into a stream 14 of purified CO$_2$ at a predetermined pressure, as described previously.

The second outlet N3 of column N may be connected to the inlet of at least one of the cooling circuits F1 and F2, either directly or via a heating circuit F6 and optionally a compressor, which may be a dedicated compressor J3 or the compressor J2 described in the text hereinabove. The CO$_2$-depleted fraction 16 is thus recycled by mixing it:
with the mixture 1, before step i), upstream of the first phase separator E1, optionally being first compressed in the compressor J3 to reach a predetermined pressure, and/or
with the H$_2$-depleted gas 2 leaving the PSA B, between steps ii) and iii), upstream of the second phase separator E2, in this case at the compressor J2.

Thus, the CO$_2$ still present in fraction 16 may be at least partly recovered in the cryogenic unit C, which makes it possible to maintain a high CO$_2$ recovery yield.

Figure 5:
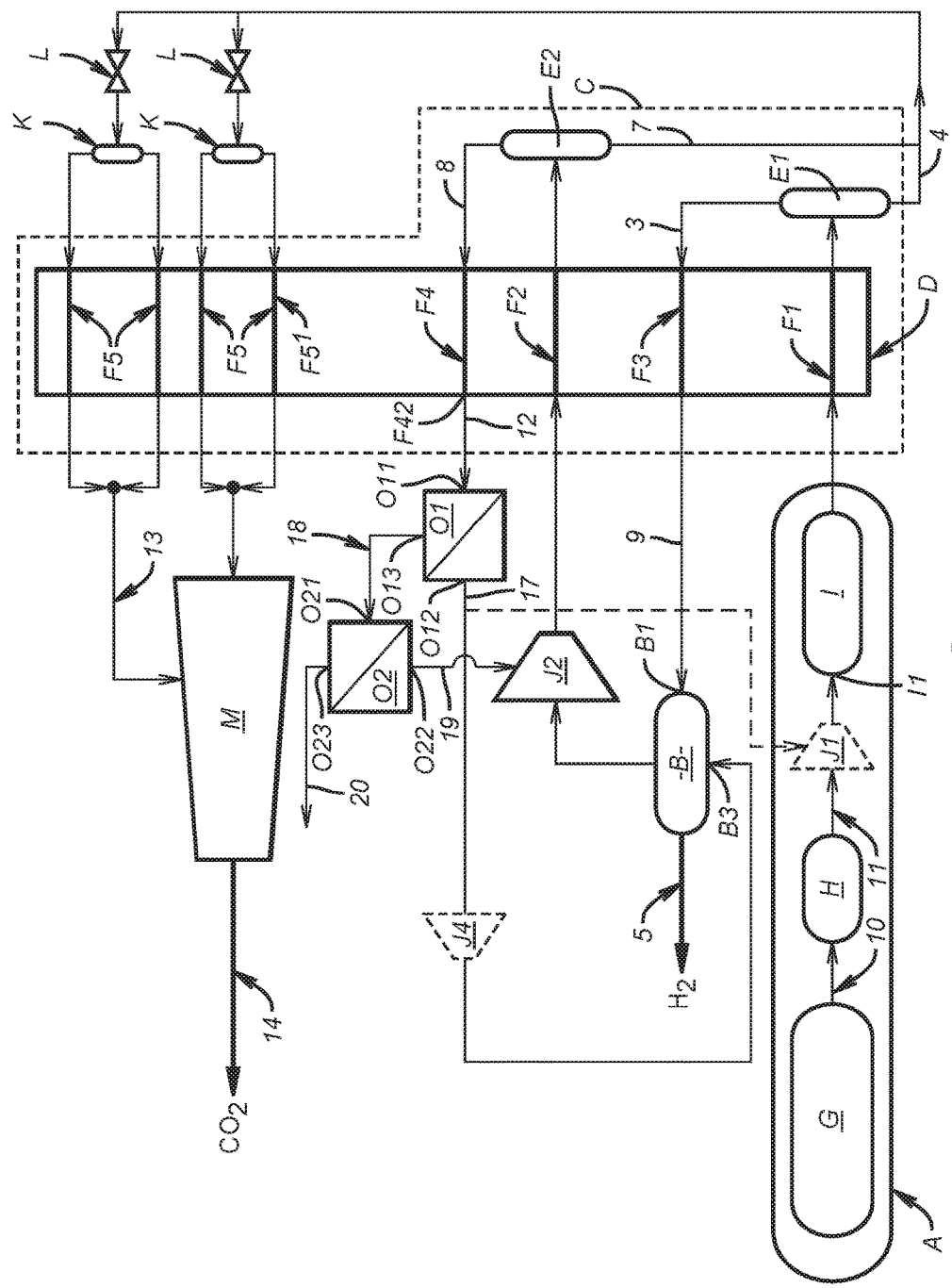
FIG. 5 provides an alternate embodiment of the present invention.

FIG. 5 shows another embodiment variant of the installation for performing the process according to the invention. This variant differs from that of FIG. 2 essentially in that the installation also comprises two membrane systems O1 and O2. The first membrane system O1 makes it possible to recover the hydrogen remaining in the gas 8 leaving the second phase separator E2, whereas the second system O2 makes it possible to recover the CO$_2$ therefrom.

The first system O1 comprises an inlet O11 connected to the outlet F42 of the heating circuit F4, a first outlet O12 providing an H$_2$-rich permeate 17 and a second outlet O13 providing a CO$_2$-rich residue 18.

The first outlet O12 of the system O1 may be connected to an inlet B1 or B3 of the PSA H$_2$ B and/or to the inlet I1 of the drying unit I, either directly or via a compressor which may be a dedicated compressor J4 connected to the PSA or the abovementioned compressor J1 connected to the drying unit I. It may in fact be necessary to compress the permeate 17 that is recovered at a pressure largely inferior to that of the remaining gas 8 entering the first system O1 due to the pressure difference on which is based the principle of permeation and separation in a membrane.

The H$_2$-rich permeate 17 may thus be recycled:
by mixing it with the mixture 1, before step i), and more particularly with the mixture 11,
by mixing it with the gas 9 originating from the first phase separator E1 and from the circuit F3, between steps i) and ii), before entering the PSA H$_2$ B (inlet B1), and/or into the PSA H$_2$ B (inlet B3).

Depending on the pressure of the permeate 17, it may optionally be compressed before being recycled. In the case where its pressure is below the operating pressure of the PSA $H_2$ B, it may be compressed in the dedicated compressor J4 before recycling into the PSA $H_2$ B or compressed in the compressor J1 placed after the shift reactor H, before step i). If its pressure is greater than or equal to the operating pressure of the PSA $H_2$ B, the permeate may be recycled directly into the PSA $H_2$ B.

Said residue 18 leaving the first system O1 is recovered at a pressure that is still high and contains a large majority of the $CO_2$ present at the inlet of the first module O1, the $H_2$ and also all of the other constituents ($CH_4$, CO, $N_2$, Ar) not evacuated in the permeate 17. It is thus treated in the second membrane system O2, the inlet O21 of which is connected to the second outlet O13 of the first module O1. This second system O2 comprises a first outlet O22 providing a $CO_2$-rich permeate 19 and a second outlet O23 providing a residue 20 rich in $CH_4$, CO, $N_2$ and Ar and poor in $H_2$ and $CO_2$.

The first outlet O22 may be connected to the inlet F21 of the cooling circuit F2 directly or via a compressor, especially the compressor J2, depending on the pressure of the permeate 19. Thus, this $CO_2$-rich permeate may be recycled by mixing it with the $H_2$-depleted gas 2, between steps ii) and iii), upstream of the phase separator E2.

Such a variant makes it possible to recover the $CO_2$ and $H_2$ contained in an appreciable amount (from 40% to 60% of $H_2$ and from 15% to 35% of $CO_2$) in the remaining gas 8 originating from the second phase separator E2 and thus to achieve very high $CO_2$ recovery yields, of more than 95%, and $H_2$ recovery yields from about 75% to more than 98%, for example.

Figure 6:
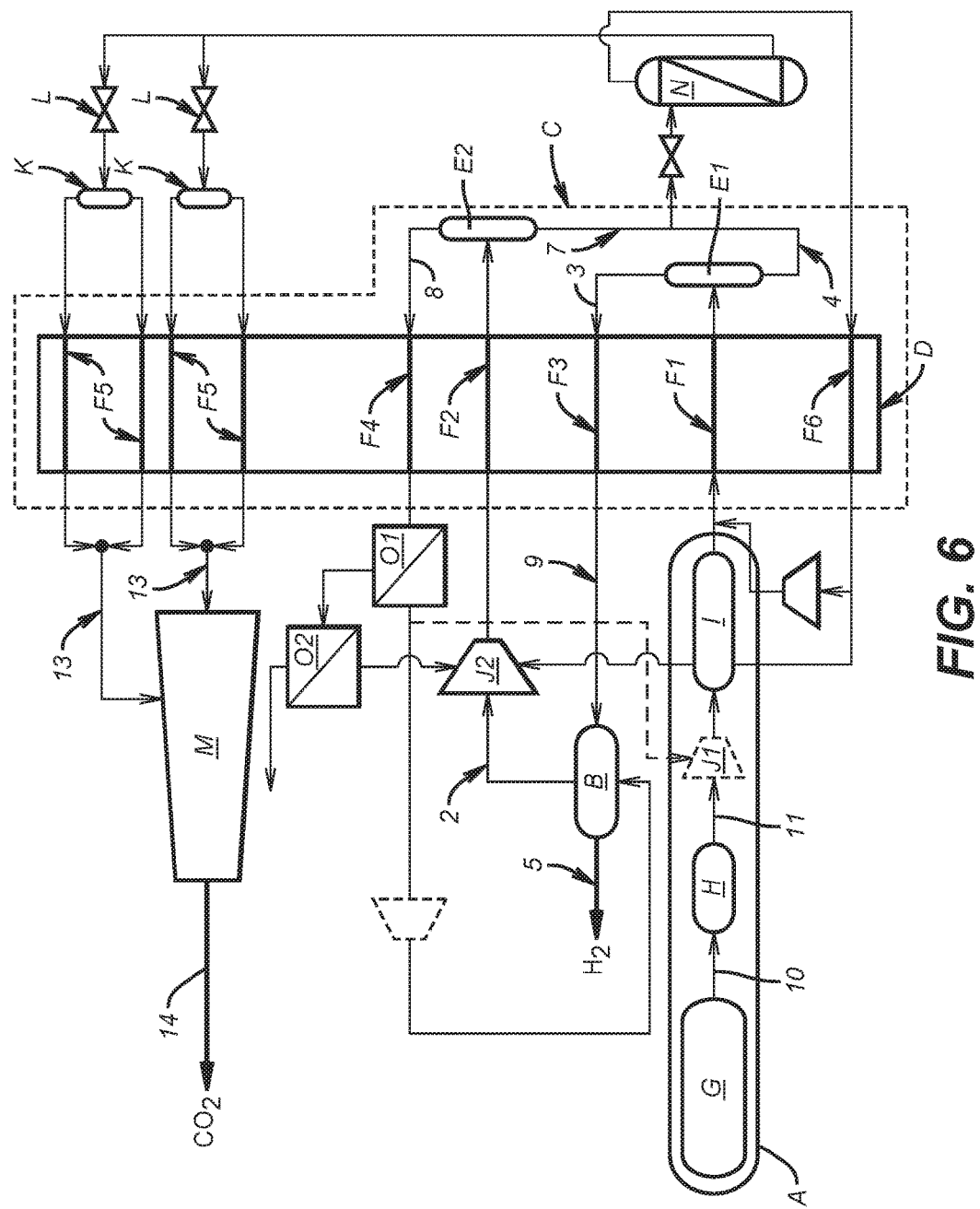
FIG. 6 provides an alternate embodiment of the present invention.

FIG. 6 shows another embodiment variant of the installation for performing the process according to the invention. This variant substantially corresponds to the combination of the variants of FIGS. 4 and 5, the installation comprising here a distillation column N and two membrane systems O1 and O2. This variant makes it possible to obtain a $CO_2$-rich liquid with a high purity and a high recovery yield of $CO_2$ and $H_2$.

It should be noted that other embodiment variants are, of course, possible and that the present invention is not limited to the embodiments represented. In particular, it is possible to combine the above variants with each other as a function of the various needs, such as the desired purity of the $CO_2$ and $H_2$.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step. The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for treating a mixture for the purpose of separating carbon dioxide and hydrogen from this mixture, the process comprising the steps of:
   i) cooling and partially condensing the mixture and then separating a first liquid from the mixture in a first phase separator;
   ii) treating a gas originating or derived from a top gas from the first phase separator in a pressure swing adsorption module for hydrogen to produce a hydrogen-rich gas and a hydrogen-depleted residual gas; and
   iii) cooling and partially condensing said hydrogen-depleted residual gas or a gas derived from said hydrogen-depleted gas and then separating a second liquid the remaining gas in a second phase separator that is different from the first phase separator,
   wherein the first liquid or second liquid or a liquid derived from the first liquid or second liquid originating from the first phase separator or from the second phase separator are rich in carbon dioxide as compared to the mixture,
   wherein the partial condensations in steps i) and iii) are performed in a same cryogenic unit,
   wherein said mixture is partially condensed in step i) at a temperature below −20° C.

2. The process as claimed in claim 1, wherein the partial condensations in steps i) and iii) are performed in one heat exchanger.

3. The process as claimed in claim 1, wherein said mixture is partially condensed in step i) at a temperature below −40° C.

4. The process as claimed in claim 1, wherein step i) comprises the following substeps:
   a first partial condensation of said mixture at a temperature below −20° C.;
   separation of the liquid from the rest of the mixture in a phase separator;
   a second partial condensation of said rest of the mixture at a temperature below −40° C.;
   separation of the liquid from the remaining gas in another phase separator;
   wherein the liquid or a liquid derived from the liquid originating from at least one of the phase separators being rich in carbon dioxide.

5. The process as claimed in claim 4, wherein the first partial condensation of said mixture is at a temperature close to about −40° C. and wherein the second partial condensation of said rest of the mixture is at a temperature of about −50° C.

6. The process as claimed in claim 1, further comprising, before step i), a preliminary step of generating a mixture rich in CO and $H_2$.

7. The process as claimed in claim 6, wherein the step of generating a mixture rich in CO and $H_2$ is selected from the group consisting of an auto-thermal reforming (ATR), steam reforming of hydrocarbons (SMR), partial oxidation (PDX) process, and combinations thereof.

8. The process as claimed in claim 6, wherein said mixture rich in CO and $H_2$ is treated in a shift reactor to give a mixture enriched in $CO_2$ and $H_2$.

9. The process as claimed in claim 6, wherein said mixture is compressed, dehydrated, or compressed and dehydrated.

10. The process as claimed in claim 1, wherein said hydrogen-depleted residual gas or said gas derived from said hydrogen-depleted gas is partially condensed in step iii) at a temperature below $-20°$ C.

11. The process as claimed in claim 10, wherein the temperature for partial condensation in step iii) is below $-40°$ C.

12. The process as claimed in claim 1, wherein the liquid or a liquid derived from the liquid originating from at least one of the phase separators is distilled to give a $CO_2$-rich fraction and a $CO_2$-depleted fraction.

13. The process as claimed in claim 12, wherein said $CO_2$-depleted fraction is recycled by mixing the $CO_2$-depleted fraction with said mixture, before step i), upstream of the first phase separator or by mixing the $CO_2$-depleted fraction with said hydrogen-depleted gas, between steps ii) and iii), upstream of the second phase separator.

14. The process as claimed in claim 1, wherein said remaining gas originating from the second phase separator is filtered by at least one membrane system.

15. An installation for treating a mixture for the purpose of separating carbon dioxide and hydrogen from this mixture, the installation comprising:

a pressure swing adsorption module for hydrogen; and
a cryogenic unit comprising a first and second phase separators, and a heat exchanger comprising a first cooling circuit, one inlet of which is configured to be connected to a source of said mixture, and an outlet of which is connected to the first phase separator, a gas outlet of which is connected to an inlet of the pressure swing adsorption module for hydrogen, the pressure swing adsorption module for hydrogen comprising a hydrogen-depleted gas outlet which is connected to an inlet of a second cooling circuit of the heat exchanger or of another heat exchanger of the cryogenic unit, an outlet of this second cooling circuit being connected to the second phase separator.

16. The installation as claimed in claim 15, wherein the heat exchanger comprises a heating circuit, an inlet of which is connected to the gas outlet of the first phase separator and the outlet of which is connected to the inlet of the pressure swing adsorption module for hydrogen.

17. The installation as claimed in claim 15, further comprising at least one element from among:
a reforming unit;
a shift reactor;
a drying unit;
a distillation column;
at least one membrane system;
at least one compressor;
at least one expander;
at least one valve; and
at least one pump.

18. The installation as claimed in claim 15, further comprising a hydrogen gas outlet connected to the module.

* * * * *